US Patent [19]  
Labana et al.

[11] 3,758,632  
[45] Sept. 11, 1973

[54] POWDERED COATING COMPOSITION OF UNSATURATED GLYCIDYL AND ANHYDRIDE COPOLYMER AND A FLOW CONTROL AGENT

[75] Inventors: Santokh S. Labana, Dearborn Heights; Ares N. Theodore, Farmington, both of Mich.

[73] Assignee: Ford Motor Company, Dearborn, Mich.

[22] Filed: Aug. 16, 1971

[21] Appl. No.: 172,235

[52] U.S. Cl. ..... 260/836, 117/93.4 R, 117/126 GE, 117/126 GR, 117/132 BE, 260/30.6 R, 260/31.8 E, 260/31.8 M, 260/37 EP, 260/41 A, 260/41 B, 260/41 C, 260/830 R, 260/835
[51] Int. Cl. .............. C08g 45/04, C08g 45/00
[58] Field of Search ................ 260/836, 830 R

[56] References Cited
UNITED STATES PATENTS

| | | | |
|---|---|---|---|
| 3,070,564 | 12/1962 | Roeser | 260/836 |
| 3,222,419 | 12/1965 | Jubilee | 260/836 |
| 3,297,621 | 1/1967 | Taft | 260/836 |
| 3,514,419 | 5/1970 | Darlow | 260/836 |
| 3,652,476 | 3/1972 | Fellers | 260/830 TW |

*Primary Examiner*—Paul Lieberman
*Attorney*—Keith L. Zerschling and William E. Johnson

[57] ABSTRACT

Powder coating compositions are disclosed. In general, individual powder coating compositions of this invention are a mixture of several materials. The most significant materials employed in the powder coatings include the following. A copolymer containing epoxy and anhydride crosslinkale, functional groups, forms the most important constituent of the powder coating. This copolymer has a glass transition temperature in the range of 40°C to 90°C and a molecular weight ($M_n$) in the range from about 3,000 to about 10,000. Another material of an individual composition is a flow control agent which forms at least 0.05 percent by weight of the mixture. The flow control agent is a polymer having a molecular weight ($M_n$) of at least 1000. Also, the flow control agent has a glass transition temperature at least 50°C lower than the glass transition temperature of the copolymer. Other materials which may be employed in individual powder coating compositions are catalysts, pigments, antistatic agents and plasticizers.

5 Claims, No Drawings

POWDERED COATING COMPOSITION OF UNSATURATED GLYCIDYL AND ANHYDRIDE COPOLYMER AND A FLOW CONTROL AGENT

BACKGROUND OF THE INVENTION

Powder coating compositions for use in the painting of surfaces are extremely desirable. Such coating compositions are desirable because they eliminate the solvents utilized in liquid paint systems, as for example, the paint system shown in U.S. Pat. No. 2,857,354 issued Oct. 21, 1958. A powder coating paint composition is curable by heat in a manner that little, if any, volatile material is given off to the environment. This, of course, is substantially different from a liquid paint system as the liquid paint vehicle must be volatilized during the drying of the paint. Volatilization of the liquid vehicle carries such vaporized material into the ambient.

This invention is directed to powder coating compositions which are suitable for finishing surfaces of articles with a protective and decorative coating. The coating produced by the compositions of this invention are comparable on all terms with the coating produced by prior art liquid paint systems.

SUMMARY OF THE INVENTION

This invention is directed to powder coating compositions and, more particularly, to powder coating compositions which are curable by heat and which do not contain external crosslinking agents. Individual ones of the powder coating compositions formed in accordance with the teachings of this invention comprise an intimate mixture of several materials. Materials such as antistatic agents, catalysts, plasticizers and pigments may be included in individual compositions to achieve desired effects. Another material, which is of significant importance, and which is included in each individual powder coating composition is a copolymer containing epoxy and anhydride crosslinkable, functional groups. This copolymer has a glass transition temperature in the range of 40°C to 90°C and a molecular weight ($\bar{M}_n$) in the range from about 3,000 to about 10,000. In greater detail, the copolymer may contain, for example, (a) approximately stoichiometric quantities of functional, ethylenically unsaturated monomers, one containing epoxy functional groups and the other anhydride functional groups, and (b) ethylenically unsaturated monomers containing no functional groups and so selected that when both types of the monomers are reacted to produce the copolymer, the copolymer will have the glass transition temperature and molecular weight mentioned.

Another significant material employed in individual powder coating compositions of this invention is a flow control agent which forms at least 0.50 percent by weight of the total mixture. The flow control agent is a polymer having a molecular weight ($\bar{M}_n$) of at least 1000. The flow control agent has a glass transition temperature at least 50°C below the glass transition temperature of the copolymer.

As previously mentioned, a powder coating composition formed in accordance with the teachings of this invention may include a small weight percentage of a catalyst. Generally, the catalyst is selected to produce a gel time for the powder coating composition greater than one minute at the baking temperature of the composition. The coating composition may also use therein a pigment which can form from about 6 percent by weight to about 35 percent by weight of the total mixture depending on the pigment selected. The powder coating composition may also include a small weight percentage of an antistatic agent so that the composition may be applied in an electrostatic spray operation.

Some particular materials which have been found suitable for use in making powder coating compositions in accordance with the teachings of this invention are set forth below. The materials are representative of the various types of material which may be used but individual powder coating compositions of this invention are not limited to these specific materials.

The copolymer of the coating composition should contain from about 2 percent by weight to about 12 percent by weight of the monomer supplying the epoxy functional groups to the copolymer. The monomer supplying the anhydride functional groups should be present in the copolymer in the range from about 2 percent by weight to about 8 percent by weight. Glycidyl methacrylate and glycidyl acrylate are monomers which are suitable for supplying the epoxy functional groups. The anhydride functional groups may be supplied by monomers such as maleic anhydride, itaconic anhydride, citraconic anhydride, dodecenyl succinic anhydride, dichloromaleic anhydride and tetrahydrophthalic anhydride. The monomers containing the functional groups are mixed with other, non-functional group containing monomers in order to form a copolymer having the desired glass transition temperature range and molecular weight range. Some monomers which are suitable for mixing with the functional monomers are methyl methacrylate, butyl methacrylate, ethyl acrylate, butyl acrylate, 2-ethylhexyl acrylate, styrene, alpha methyl styrene, acrylonitrile, methacrylonitrile, etc.

With respect to the flow control agents used in the powder coating mixture, an individual agent selected for a mixture may be an acrylic polymer having a glass transition temperature at least 50°C below the glass transition temperature of the mixture's copolymer. Preferred acrylic polymers which may be used as the flow control agent are polylauryl acrylate polybutyl acrylate, poly (2-ethylhexyl acrylate), polylauryl methacrylate, polybutyl methacrylate, poly (2-ethylhexyl methacrylate) and polyisodecyl methacrylate.

The flow control agent may also be a fluorinated polymer having a glass transition temperature at least 50°C below the glass transition temperature of the copolymer utilized in the mixture. Preferred flow control agents, if the agent is a fluorinated polymer, are esters of polyethyleneglycol or polypropyleneglycol and fluorinated fatty acids. For example, an ester of polyethyleneglycol of molecular weight of over 2,500 and perfluoro octanoic acid is useful as a flow control polymer.

A small weight percentage of a catalyst may be added to the powder coating composition in order to increase the cross linking rate of the powder coating composition at the baking temperature thereof. In preference, the catalyst produces a gel time for the powder coating composition of at least 1 minute but no greater than 40 minutes. The preferred catalyst is one which produces a gel time of at least 1 minute but no greater than 10 minutes. In general, the catalyst is presented in the range of from 0.05 percent by weight to 1 percent by weight of the weight of the mixture. The most desirable gel time produced by the catalyst is in a time range of from about 2 minutes to about 6 minutes. These catalyst gel times are at baking temperatures for the powder coating compositions in the range of 130°C to 200°C.

The powder coating compositions of this invention may also contain from about 6 percent by weight to about 35 percent by weight of a pigment. The various pigments already known in the art may be employed in the powder coating compositions. The pigments are generally selected for color, appearance and/or corrosion protection properties.

A small weight percent of an antistatic agent may also be employed in the powder coating composition. For example, 0.01 percent by weight to 0.3 percent by weight of the powder coating composition may be an antistatic agent so that the coating may be applied in an electrostatic spraying operation.

The powder coating compositions of this invention may also contain a plasticizer. If used, the plasticizer is present from about 2 percent by weight to about 10 percent by weight of the powder.

DESCRIPTION OF THE PREFERRED EMBODIMENT

A general discussion of the various materials which may be employed in the powder coating compositions of this invention will be set forth below. Also, a plurality of examples will be employed to show the manner in which various, individual, powder coating compositions, which fall within the scope of this invention are prepared and utilized.

The principal material in individual powder coating compositions is the copolymer containing epoxy and anhydride crosslinkable, functional groups. The copolymer is so formed that it has a glass transition temperature in the range of 40°C to 90°C and a molecular weight ($\bar{M}_n$) in the range from about 3,000 to about 10,000. The copolymer is generally formed from (a) functional monomers containing epoxy functional groups and anhydride functional groups and (b) modifying monomers containing no functional groups (after copolymerization) and so selected that the copolymer has the glass transition temperature and the molecular weight described. Particular powder coating compositions are made from a copolymer which is formed by reacting (a) approximately stoichiometric quantities of two ethylenically unsaturated monomers, one containing epoxy functional groups and the other containing anhydride functional groups with (b) ethylenically unsaturated monomers containing no functional groups.

Glycidyl methacrylate and glycidyl acrylate are particularly desirable monomers for forming the epoxy supplying monomer for the copolymer. When these materials are used, they are present in the copolymer from about 2 percent by weight to about 12 percent by weight.

Maleic anhydride, itaconic anhydride, citraconic anhydride, duodecenyl succinic anhydride, dichloromaleic anhydride, and tetrahydrophthalic anhydride are particularly desirable monomers for forming the anhydride supplying monomer for the copolymer. When these materials are used, they are present in the copolymer from about 2 percent by weight to about 8 percent by weight.

The nonfunctional monomers which may be reacted with the functional monomers to produce the copolymer having the stated glass transition temperature and molecular weight are many in number. Some of the preferred nonfunctional monomers are methyl methacrylate, butyl methacrylate, ethyl acrylate, butyl acrylate, 2-ethylhexyl acrylate, styrene, alpha methyl styrene, acrylonitrile and methacrylonitrile.

The copolymers can be prepared by a variety of methods. Generally, a free radical initiator is needed to induce polymerization reaction. A large number of free radical initiators are known in the art. These include benzoyl peroxide, lauryl peroxide, t-butylhydroxyperoxide, acetylcyclohexane sulfonyl peroxide, diisobutyrl peroxide, di-(2-ethylhexyl) peroxydicarbonate, diisopropyl peroxydicarbonate, t-butylperoxypivalate, decanoyl peroxide, azobis (2-methylpropionitrile) known as AIBN, etc. The polymerization is preferably carried out in solution using a solvent in which the copolymer is soluble. Toluene, benzene, xylene, dioxane, butanone, etc., are suitable solvents for polymerization. If the copolymer is prepared in solution it can be used in that form or the solid copolymer can be obtained by evaporating the solvent under vacuum or spray drying techniques. Alternatively, the copolymer can be precipitated by pouring the copolymer solution at a slow rate into a non-solvent liquid such as hexane, octane or water under a suitable agitation condition. The copolymer thus obtained can then be dried so that it contains less than 3 percent of the volatile liquids.

The copolymers can also be prepared by emulsion polymerization, suspension polymerization, bulk polymerization or their suitable combination. In these methods of preparing the copolymers, chain transfer agents may be required to control the molecular weight of the copolymer to a desired range.

For powder coating applications, molecular weight and molecular weight distribution of the copolymer is important. Copolymer of average molecular weight ($\bar{M}_n$) in the range of 3,000 to 10,000 are suitable. These copolymers, however, must not contain significant amounts of higher molecular weight fractions. No more than 2 percent of the copolymer can be of molecular weight greater than 20,000. The molecular weight distribution as measured by the ratio of weight average molecular weight to number average molecular weight ($\bar{M}_w/\bar{M}_n$) should be in the range of 1.6 to 2.1. The preferred range of molecular weight distribution is in the range of 1.7 to 1.8.

A flow control agent is also included in forming each individual one of the powder coating compositions of this invention. The flow control agent forms at least 0.05 percent by weight of an individual powder coating. The flow control agent generally does not exceed about 4 percent by weight of any individual powder coating composition. In general, the flow control agent is a polymer having a molecular weight ($\bar{M}_n$) of at least 1000. Further, the flow control agent has a glass transition temperature at least 50°C below the glass transition temperature of the copolymer employed in forming the composition.

One type of material which is used as a flow control agent in the powder coating compositions is an acrylic polymer having a glass transition temperature at least 50°C below the glass transition temperature of the composition's copolymer. Some acrylic polymers which are preferred as flow control agents are polylauryl acrylate, polylauryl methacrylate, polybutyl acrylate, polybutyl methacrylate, poly (2-ethylhexyl acrylate) and poly (2-ethylhexyl methacrylate). Acrylic polymers to be used as flow control agents can be prepared by polymerization of the acrylate or methacrylate monomers in bulk or in suitable solvent using well known free radical initiators. The amount of the initiator and the polymerization conditions are chosen so that polymer formed has molecular weight ($\bar{M}_n$) above 1000. The preferred molecular weight range of the acrylate polymer is above 5000. The most preferred range of the acrylate polymer is 6,000 to 20,000.

Although polymeric acrylate flow control agents are preferred, fluorinated polymers have been found to act as flow control agents for the powder coating compositions. Such fluorinated polymers are esters of polyethyleneglycol or polypropylene glycol and fluorinated fatty acids. Esters of polyethylene glycol of molecular weight ($\bar{M}_n$) of over 2,500 and perfluoro octanoic acid are useful as flow control agents for the compositions of this invention.

The compositions of this invention can each contain a small, effective weight percentage of a catalyst. In general, the catalyst is present in an individual composition in a range from 0.05 percent by weight to 1.0 percent by weight. The catalyst is selected to produce a gel time for the powder coating composition greater than at least 1 minute at the baking temperature of the composition. A suitable catalyst is also one which will produce a gel time that does not exceed 40 minutes. As used herein, the gel time of a coating composition is that time in which the coating composition develops elasticity and resistance to flow at the baking temperature.

Some catalysts which are suitable for use in the powder coating composition include tetralkylammonium salts, imidazole type catalysts, tertiary amines, triaryl phosphates and metal salts or organic carboxylic acids. The tetralkylammonium salts catalysts include the following: tetrabutylammonium chloride (bromide or iodide), tetraethylammonium chloride (bromide or iodide), tetramethylammonium chloride, dodecyl dimethyl (2-phenoxyethyl) ammonium bromide and diethyl (2-hydroxy ethyl) methyl ammonium bromide. Suitable catalysts of the imidazole type include: 2-methyl- 4-ethyl imidazole, 2-methyl imidazole, imidazole, 2-[(N-benzylanilino) methyl] -2-imidazoline phosphate, and 2-benzyl-2-imidazoline hydrochloride. Suitable tertiary amine catalyst for the powder coating compositions of this invention include: trithylenediamine, N,N-diethylcyclohexylamine, and N-methyl morpholine. The metal salts of organic carboxylic acid which are catalyst for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate. An example of triarylphosphate type catalyst is triphenylphosphate.

The catalyst used in an individual powder coating composition is preferably solid at room temperature and has a melting point of from 50°C to 200°C. As previously specified, the catalyst is present in a powder coating composition from 0.05 percent by weight to 1.0 percent by weight of the total weight of the powder composition. Further, the catalyst produces a gel time of at least 1 minute and no greater than 40 minutes. Generally, the preferred gel time of the composition is in the range of from 1 minute to approximately 6 minutes at the baking temperature of the composition.

Since individual powder coating compositions of this invention can be applied to an article to be painted by electrostatic methods, it is preferred to include a small weight percentage of an antistatic agent in such compositions so that the deposition thereof is accomplished in a proper manner. In particular, the antistatic agent is included in a range from 0.01 percent to 0.3 percent by weight of the total powder composition. Suitable antistatic agents include, but are not limited to, tetralkylammonium salts as discussed previously and which also serve as catalyst. Other suitable antistatic agents include: alkyl-poly (ethyleneoxy) phosphates as, for example, dibutylpoly (ethyleneoxy) phosphate or alkylaryl poly (ethyleneoxy) phosphates as for example, ethyl benzyl poly (ethyleneoxy) phosphate, pyridine hydrochloride or inorganic salts such as lithium perchlorate.

In order to give individual powder coating compositions of this invention a suitable color, a pigment is included in the coating composition. In general, the pigment forms from about 6 percent by weight to about 35 percent by weight of the total powder coating composition. Pigments which are suitable for powder coating compositions include, but are not limited to, the following: basic lead silico chromate 30 percent by weight (orange); titanium dioxide 30 percent by weight (white); titanium dioxide 15 percent by weight plus ultra marine blue 10 percent by weight (blue); phthalocyanine blue 7 percent by weight plus titanium dioxide 10 percent by weight (blue); phthalocyanine green 7 percent by weight plus titanium dioxide 10 percent by weight (green); ferrite yellow 7 percent by weight plus titanium dioxide 10 percent by weight (yellow); carbon black pigment 6 percent by weight (black); black iron oxide 10 percent by weight (black); chromium green oxide 8 percent by weight plus titanium dioxide 10 percent by weight (green); quindo red 5 percent by weight plus titanium dioxide 16 percent by weight (red); and iron oxide transparent orange pigment 10 percent by weight (orange).

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are; adipates: di(n-hexyl) adipate, diisooctyl adipate, dicyclohexyl adipate; phosphates: triphenylphosphate, tricreylphosphate, tributylphosphate; phthalates: dibutylphthalate, dioctyphthalate, butyl octyl phthalate; and sebacates: dioctyl sebacate, butyl benzyl sebacate, and dibenzyl sebacate.

Having generally described the various materials which are employed in formulating the powder coating composition of this invention, a plurality of examples will be set forth to illustrate various individual powder coating compositions.

EXAMPLE 1

The monomers, maleic anhydride 4 grams, styrene 4 grams, glycidyl methacrylate 6 grams, methyl methacrylate 46 grams, butyl methacrylate 40 grams, and the initiator t-butylperoxypivate 3 grams is formed into a mixture. Three hundred grams of benzene is charged into a 1 liter flask which is equipped with a dropping funnel, condenser, stirrer, thermometer and nitrogen inlet. The monomer mixture is placed in the dropping funnel. The flask is heated to 80°C and a refluxing of the solvent is achieved. While maintaining the reaction temperature at 80°C, the monomer mixture is added in a dropwise fashion over a 2 hour period. After the addition is complete, the reaction is continued for another two hours. The contents of the flask is then cooled to room temperature.

One hundred ml of the monomer solution is mixed with: titanium dioxide 4.6 grams, ferrite yellow 5.7 grams, poly (2-ethylhexyl acrylate) ($\overline{M}_n$)=9000, 0.3 grams. The mixture is dispersed and then is dried in a vacuum oven at 70°C. The powder coating obtained is ground to pass through a 200 mesh sieve.

The resulting powder thus obtained is a powder coating composition of the invention. The powder is sprayed onto an electrically grounded, steel panel by using electrostatic powder spray gun operating at 50 KV charging voltage. After spraying, the panel is heated at 175°C. for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE 2

The monomers, maleic anhydride 3 grams, glycidyl methacrylate 8 grams, styrene 4 grams, methyl methacrylate 40 grams, butyl acrylate 45 grams, and the initiator 2,2'-azobis (2-methyl-propionitrile) (AIBN) are formed into a mixture. The mixture is reacted in accordance with the procedure of Example 1. The cooled, reacted mixture, however, is spray dried at 60°C air temperature. The spray dried powder is ground to pass through a 100 mesh screen.

One hundred parts by weight of the ground copolymer are mixed with the following materials:

| | |
|---|---|
| Tetrabutyl ammonium bromide | 0.1 parts |
| Polylauryl acrylate ($\overline{M}_n$=10,000) | 0.5 parts |
| Titanium dioxide | 30 parts |

The materials are mixed together in a ball mill for 2 hours. The mixture is milled rolled at 85°C to 90°C for 5 minutes. The solid obtained is ground in a ball mill to pass through a 140 mesh screen.

The resulting powder thus obtained in a powder coating composition of the invention. The powder is sprayed on an electrically grounded, steel panel by using electrostatic powder spray gun operating at 50 KV charging voltage. After spraying, the panel is heated at 175°C for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE 3

The monomers, maleic anhydride 2 grams, glycidyl methacrylate 3 grams, ethyl methacrylate 95 grams and the initiator AIBN 4 grams are reacted and processed as described in Example 2 to produce a ground copolymer. One hundred parts of the copolymer produced is mixed with the same additional ingredients described in Example 2.

The powder coating composition obtained by following the process steps set forth in Example 2 is applied to test panels in the same manner as described in Example 2. The coating is baked at a temperature of 170°C for 30 minutes. The coating obtained has good adhesion to steel, glass, brass, zinc, aluminum, copper and bronze.

EXAMPLE 4

The monomers, maleic anhydride 4.5 grams, glycidyl methacrylate 4.5 grams, methyl methacrylate 50 grams, butyl methacrylate 41 grams, and the initiator AIBN 3 grams are reacted and processed as described in Example 2 to produce a ground copolymer.

The ground copolymer (100 parts by weight) is added to the following materials:

| | |
|---|---|
| Tetrabutyl ammonium chloride | 0.1 parts |
| Polybutylacrylate ($\overline{M}_n$=9000) | 4 parts |
| Titanium dioxide | 15 parts |
| Epon 1001 | 10 parts |
| Ultra marine blue | 10 parts |

The above ingredients are mixed together and processed in accordance with the procedure of Example 2 to obtain a powder coating composition. The powder coating composition is sprayed on various test panels of steel, glass, brass, zinc, aluminum, copper and bronze. The coating obtained on each test panel after curing of the powder coating composition at a temperature of 200°C for 10 minutes is of good quality, and is solvent and scratch resistant.

EXAMPLE 5

The monomers, maleic anhydride 4 grams, glycidyl methacrylate 8 grams, styrene 18 grams, methyl methacrylate 65 grams, ethyl acrylate 5 grams, and the initiator AIBN 1 gram are reacted in accordance with the procedure of Example 1. The cooled, reacted mixture, however, is vacuum dried at 60°C. The dried powder is then ground to pass through a 100 mesh screen.

One hundred parts by weight of the copolymer obtained is mixed with the following materials:

| | |
|---|---|
| 2-methyl- 4-ethylimidazole | 0.05 parts |
| Dibutyl poly(ethyleneoxy) phosphate | 0.05 parts |
| Polyisododecylmethacrylate | 4 parts |
| Titanium dioxide | 10 parts |
| Phthalocyanine blue | 7 parts |

A powder coating composition is obtained by following the process steps set forth in Example 2. The coating composition is applied to a series of test panels and baked at the temperature of and for the same time as Example 4. The coating obtained on the various test panels is of good quality with respect to its adhesion appearance and impact characteristics.

EXAMPLE 6

A monomer mixture having the following composition is prepared: itaconic anhydride 4 grams, glycidyl methacrylate 5 grams, methyl methacrylate 46 grams, butyl methacrylate 45 grams, and the initiator AIBN 4 grams. This mixture is reacted and processed as described in Example 5 to produce a ground copolymer.

One hundred parts by weight of the copolymer obtained is added to the following materials:

| | |
|---|---|
| Triethylene diamine | 0.05 parts |
| Tetraethylammonium chloride | 0.05 parts |
| Polylaurylmethacrylate ($\overline{M}_n$=6000) | 2 parts |

| | |
|---|---|
| Phthaloycanine green | 7 parts |
| Titanium dioxide | 10 parts |

The above described materials are processed as described in Example 2 in order to produce a powder coating composition. The powder coating composition is applied to test panels as described in Example 2 and baked on the panels at a temperature of 150°C for 15 minutes.

The coating obtained has good adhesion to steel, glass, brass, zinc, aluminum, copper and bronze and is insoluble in toluene, gasoline, methanol and butanone.

EXAMPLE 7

A monomer mixture having the following composition is prepared: itaconic anhydride 5 grams, glycidyl methacrylate 5 grams, methyl methacrylate 70 grams, ethyl acrylate 20 grams, and the initiator AIBN 3 grams. The mixture is reacted and processed as described in Example 5 to produce a ground copolymer.

One hundred parts by weight of the copolymer obtained is added to the following materials:

| | |
|---|---|
| Tetramethyl ammonium chloride | 1 part |
| Poly(2-ethylhexyl acrylate) ($\bar{M}_n$=20,000) | 2 parts |
| Epon 1002 | 6 parts |
| Ferrite yellow | 7 parts |
| Titanium dioxide | 10 parts |

This mixture is processed as described in Example 2 in order to form a powder coating composition. The powder coating composition is applied to test panels as described in Example 2. The panels are baked at a temperature of 180°C for 5 minutes. The adhesion quality of the powder coating after baking on the various test panels is good. The coating on each panel possesses good solvent and scratch resistance.

EXAMPLE 8

A monomer mixture having the following composition is prepared: itaconic acid 8 grams, glycidyl acrylate 8 grams, styrene 14 grams, methyl methacrylate 50 grams, butyl acrylate 20 grams, and the initiator AIBN 4 grams. The mixture is reacted and processed as described in Example 2 to produce a ground copolymer.

One hundred parts of the ground copolymer obtained is added to the following materials:

| | |
|---|---|
| Trimethyl benzyl ammonium chloride | 0.1 part |
| Poly(2-ethylhexyl acrylate) ($\bar{M}_n$=11,000) | 2 parts |
| Epon 1002 | 8 parts |
| Carbon black | 6 parts |

The above materials are mixed and processed as set forth in Example 2. The resulting powder coating composition is applied to test panels as specified in Example 2. The coating composition is baked at 170°C for 15 minutes. All the painted panels exhibit good adhesion and solvent resistance properties.

EXAMPLE 9

A monomer mixture having the following composition is prepared: itaconic anhydride 5 grams, glycidyl methacrylate 7 grams, methyl methacrylate 33 grams, butyl methacrylate 55 grams, and the initiator AIBN 3 grams. The mixture is reacted and processed as described in Example 2 to produce a ground copolymer.

One hundred parts of the ground copolymer obtained is added to the following materials:

| | |
|---|---|
| Dodecyldimethyl (2-phenoxy-ethyl) ammonium bromide | 0.5 parts |
| Polyethylene glycol perfluro octonoate ($\bar{M}_n$=3400) | 2 parts |
| Black iron oxide | 10 parts |
| Butyl benzyl phthalate | 3 parts |

The mixture so formed is processed as described in Example 2 to produce a powder coating composition. This powder coating composition is applied to test panels as it is described in Example 2. The coated panels are baked at 165°C for 15 minutes. The coating on each panel has good adhesion and solvent resistance.

EXAMPLE 10

A monomer mixture having the following composition is prepared: itaconic anhydride 4 grams, glycidyl methacrylate 4 grams, methyl methacrylate 42 grams, methacrylamide 10 grams, butyl methacrylate 40 grams, and the initiator AIBN 4 grams. The mixture is reacted and processed as described in Example 5 to produce a ground copolymer.

One hundred parts by weight of the ground copolymer is mixed with the following materials:

| | |
|---|---|
| Tetraethylammonium bromide | 0.2 parts |
| Ethyl benzyl(ethyleneoxy) phosphate | 0.5 parts |
| Poly (2-ethylhexyl acrylate) ($\bar{M}_n$=1500) | 0.4 parts |
| Chromium green oxide | 8 parts |
| Titanium dioxide | 10 parts |
| Dioctyl sebacate | 7 parts |

The above mixture is processed as described in Example 2 to produce a powder coating composition. The powder coating composition is applied to a plurality of test panels as is described in Example 2. The panels are baked at a temperature of 170°C for 20 minutes. The adhesion to the test panels of the powder coating material is good.

There has been disclosed herein powder coating compositions which may be employed in the painting of articles. Many modifications of this invention will be apparent to those skilled in the art in view of this specification. It is intended that all such modifications which fall within the scope of this invention be included within the appended claims.

What we claim is:

1. A powder coating composition which, free of catalyst, pigments and other ingredients, comprises a mixture of:

A. a copolymer containing (a) approximately stoichiometric quantities of two mono-ethylenically unsaturated monomers, one monomer containing from about 2 percent by weight to about 12 percent by weight epoxy functional groups and the other monomer containing from about 2 percent by weight to about 8 percent by weight anhydride functional groups and (b) modifying monomers containing no functional groups and so selected that said copolymer has a glass transition temperature in the range of 40°C to about 90°C and a molecular weight ($\bar{M}_n$) in the range of from about 3,000 to about 10,000; and B. a flow control agent forming at least from about 0.05 percent to about 4.0 percent by weight of the mixture, said flow control agent being a polymer having a molecular weight ($\bar{M}_n$) of at least 1,000, said flow control agent being a polymer or a copolymer selected from the group consisting of acrylate esters, methacrylate esters and polyethylene or polypropylene glycol esters of fluorinated fatty acids.

2. A powder coating composition which, exclusive of catalyst, pigment, plasticizer, and an antistatic agent, comprises a mixture of:
   A. a copolymer containing (a) approximately stoichiometric quantities of two mono-ethylenically unsaturated monomers, one monomer containing from about 2 percent by weight to about 12 percent by weight of epoxy functional groups and the other monomer containing from about 2 percent by weight to about 8 percent by weight anhydride functional groups, and (b) ethylenically unsaturated monomers containing no functional groups and so selected that when both types of said monomers are reacted at their sites of unsaturation to form said copolymer, said copolymer will have a glass transition temperature in the range of 40°C to 90°C and a molecular weight ($\overline{M}_n$) in the range of 3,000 to about 10,000; and
   B. a flow control agent forming from at least about 0.05 percent to about 4.0 percent by weight of the mixture, said flow control agent being a polymer having a molecular weight ($\overline{M}_n$) of at least 1,000, said flow control agent being a polymer or copolymer selected from the group consisting of acrylate esters, methacrylate esters and polyethylene or polypropylene glycol esters of fluorinated fatty acids.

3. A powder coating composition comprising a mixture of:
   A. a copolymer formed from (a) approximately stoichiometric quantities of a monomer containing from about 2 percent to about 12 percent by weight of epoxy functional groups selected from the group consisting of glycidyl methacrylate and glycidyl acrylate and a monomer containing from about 2 percent to about 8 percent by weight of anhydride functional groups selected from the group consisting of maleic anhydride, itaconic anhydride, citraconic anhydride, dodecenyl succinic anhydride, dichloromaleic anhydride, and tetrahydraphthalic anhydride, said copolymer also containing (b) ethylenically unsaturated modifying monomers having no functional groups and so selected that said copolymer has a glass transition temperature of from 40°C to about 90°C and a molecular weight ($M_n$) in the range from about 3,000 to about 10,000;
   B. a flow control agent forming from at least 0.05 percent to about 4.0 percent by weight of the mixture, said flow control agent being a polymer having a molecular weight ($M_n$) of at least 1,000, said flow control agent being a polymer or a copolymer selected from the group consisting of acrylate esters, methacrylate esters and polyethylene or polypropylene glycol esters of fluorinated fatty acids; and
   C. a small weight percent of a catalyst which produces a gel time for the powder coating composition greater than 1 minute at the baking temperature of the composition.

4. A powder coating composition of claim 3 wherein: said modifying monomers are selected from the group consisting of methyl methacrylate, butyl methacrylate, ethyl acrylate, butyl acrylate, 2-ethylhexyl acrylate, styrene, alpha methyl styrene, acrylonitrile, and methacrylonitrile.

5. The powder coating composition of claim 3 wherein: a pigment is included which forms from about 6 percent by weight to about 35 percent by weight of the total mixture, wherein: a small weight percentage of an antistatic agent is included, and wherein: a plasticizer is included from about 2 percent by weight to about 10 percent by weight of the total mixture.

* * * * *